United States Patent
Bienstman et al.

(10) Patent No.: US 12,519,547 B2
(45) Date of Patent: Jan. 6, 2026

(54) PHOTONIC MACHINE LEARNING BASED SIGNAL RECOVERY IN SELF-COHERENT DETECTORS

(71) Applicants: UNIVERSITEIT GENT, Ghent (BE); IMEC VZW, Leuven (BE)

(72) Inventors: Peter Bienstman, Ghent (BE); Sarah Masaad, Ghent (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 255 days.

(21) Appl. No.: 18/348,551

(22) Filed: Jul. 7, 2023

(65) Prior Publication Data
US 2024/0014906 A1    Jan. 11, 2024

(30) Foreign Application Priority Data
Jul. 7, 2022 (EP) .................................... 22183651

(51) Int. Cl.
*H04B 10/61* (2013.01)

(52) U.S. Cl.
CPC .................................. *H04B 10/616* (2013.01)

(58) Field of Classification Search
None
See application file for complete search history.

(56) References Cited

U.S. PATENT DOCUMENTS

| | | | |
|---|---|---|---|
| 9,749,060 B1* | 8/2017 | Wang | H04B 10/614 |
| 2007/0092259 A1* | 4/2007 | Bontu | H04B 10/6161 |
| | | | 398/147 |
| 2013/0156443 A1* | 6/2013 | Lowery | H04B 10/6163 |
| | | | 398/141 |
| 2014/0357312 A1* | 12/2014 | Davis | H04N 23/70 |
| | | | 455/550.1 |

(Continued)

FOREIGN PATENT DOCUMENTS

EP      3631695 A1      4/2020

OTHER PUBLICATIONS

Argyris, A. et al., "Photonic machine learning implementation for signal recovery in optical communications", Scientific Reports, May 31, 2018, pp. 1-13.
Katumba, Andrew et al., "A Neuromorphic Silicon Photonics Nonlinear Equalizer for Optical Communications With Intensity Modulation and Direct Detection", Journal of Lightwave Technology, IEEE, May 15, 2019, pp. 2232-2239, vol. 37, No. 10.

(Continued)

*Primary Examiner* — Darren E Wolf
(74) *Attorney, Agent, or Firm* — Workman Nydegger

(57) ABSTRACT

A computer-implemented method of training a self-coherent detector module to recover distorted optical transmission signals, and processing devices adapted to perform the method are disclosed. The detector module comprises an optical filter unit, a detection unit for detecting an amplitude component of an optical input, and digital signal processing circuitry configured to retrieve a phase component of the optical input from the amplitude component. The method comprises iteratively computing updates of adjustable filter coefficients of the filter unit, based on a received first dataset, and replacing training signals of the first dataset, taking the (Continued)

updated filter coefficients into account. An initial set of filter coefficients is pre-trained on a received second dataset. Training signals of the first and second dataset comprise distorted optical transmission signals that are subjected to filtering by the filter unit.

15 Claims, 6 Drawing Sheets

(56) References Cited

U.S. PATENT DOCUMENTS

2017/0163337 A1* 6/2017 Djukic ............... H04B 10/079
2017/0170993 A1   6/2017 Jia et al.

OTHER PUBLICATIONS

Ranzini, Stenio et al., "Experimental Demonstration of Optoelectronic Equalization for Short-reach Transmission with Reservoir Computing", Arxiv.org, Cornell University Library, Oct. 8, 2020, pp. 1-4.
Sackesyn, S. et al., "Experimental realization of integrated photonic reservoir computing for nonlinear fiber distortion compensation", Optics Express, Sep. 27, 2021, pp. 30991-30997, vol. 29, No. 20.
Vandoorne, K., et al., "Experimental demonstration of reservoir computing on a silicon photonics chip", Nature Communications, Mar. 24, 2014, pp. 1-6, vol. 5, No. 3541.
Extended European Search Report from Corresponding European Patent Application No. EP22183651.3, Jan. 4, 2023.

* cited by examiner

PHOTONIC MACHINE LEARNING BASED SIGNAL RECOVERY IN SELF-COHERENT DETECTORS

FIELD OF THE INVENTION

The present invention relates to the recovery of distorted optical signals by implementing photonic machine learning techniques in optical phase-retrieving detectors. In particular, the invention relates to machine learning techniques for training coefficients of an adjustable optical filter unit that forms part of self-coherent optical detector modules. The training of the filter coefficients can be optimized to recover signals that have been distorted by various types of distortion mechanisms, including chromatic dispersion and non-linearity distortion in optical fiber transmission.

BACKGROUND OF THE INVENTION

Improving the quality of a transmission signal by trainable optical preprocessing means has gained interest in the field of optical fiber communication. Combining photonic circuits with machine learning techniques to build more powerful optical receivers is an ongoing research topic, which holds the promise to become a more efficient solution than conventional DSP-based equalization.

In Katumba, A. et al., "*A Neuromorphic Silicon Photonics Nonlinear Equalizer For Optical Communications With Intensity Modulation and Direct Detection*", Journal of Lightwave Technology, vol. 37, no. 10, pp. 2232-2239, 15 May 2019, a silicon photonics nonlinear equalizer has been simulated in which reservoir computing is used to mitigate fiber optic communication impairments. The modelled equalizer includes a 16-node integrated photonics reservoir with a single photodetector readout. In terms of bit error rate, the approach based on reservoir computing has been shown to outperform a digitally implemented FIR-based feedforward equalizer for optical signal transmission over metro link distances using NRZ on-off keying. For short-haul links using IM/DD at 40 Gb/s, the silicon photonics nonlinear equalizer has the benefit of allowing signal transmission over longer fiber distances while staying below the HD-FEC limit.

In Sackesyn, S. et al., "*Experimental realization of integrated photonic reservoir computing for nonlinear fiber distortion compensation*" Optics Express, vol. 29,issue 20, pp. 30991-30997 (2021), a photonic integrated passive reservoir has been investigated as an optical preprocessing means in optical fiber communication systems. Combined with a digitally implemented linear regression algorithm, the passive reservoir proved to be beneficial for the mitigation of distortion effects caused by fiber nonlinearity in the transmitted communication signals. The regression algorithms operates on the seventeen electrical time traces that are obtained from the reservoir nodes via an external, i.e. non-integrated, photodetector. The transmitted communication signal corresponds to a modulated optical waveform, where on-off keying at 32 Gbit/s has been used as a baseband signal for modulation. Compared to the nonlinear equalization capability of a digitally implemented tapped delay line filter of length seventeen, the reservoir based preprocessing allowed a test bit error rate to be decreased from 2.1E-1 to less than 1.0E-3 for bit streams that were optically transmitted over a 25 km long fiber channel.

The above-mentioned numerical and experimental study are limited to the IM/DD case and cannot easily be extended to more complex modulation formats, such as 16-QAM or 64-QAM, which require coherent demodulation.

In Argyris, A. et al. "*Photonic machine learning implementation for signal recovery in optical communications*", Sci Rep 8, 8487 (2018), a photonic implementation of delay-loop based reservoir computing has been investigated for the purpose of recovering distorted optical communication signals after transmission over short-reach and long-haul fiber links respectively. Improved bit error rates have been demonstrated for the delay-loop based reservoir computing approach as compared to linear classification of the directly detected transmission signal.

A disadvantage of the photonic implementation of delay-loop based reservoir computing is the reduction of processing speed, because the time duration associated with a one bit of transmitted information has to be matched with the delay time parameter of the feedback loop, which requires time-stretching. Another disadvantage of the delay-loop based reservoir computing approach is the additional power consumption that is due to the opto-electronic and subsequent electro-optic conversion of the transmitted bit stream while applying the signal mask. Also in this document, the signal transmission format has been limited to the relatively simple case of NRZ pulse amplitude modulation.

There is a need for photonic machine learning implementations for optical receivers that can be trained to recover distorted optical signals that convey information both in signal amplitude and signal phase.

SUMMARY OF THE INVENTION

It is an object of embodiments of the present invention to provide good training methods for recovering distorted optical signals in a self-coherent optical detector module that contains an adjustable optical filter unit at its input.

The above objective is accomplished by a method and device according to the present invention.

In one aspect, the present invention relates to a computer-implemented method of training a self-coherent detector module to recover optical signals that have been distorted during transmission over a communication channel. The distortions of the optical signal are compensated as a result of signal recovery, thereby restoring the original waveform of the optical signal as intended for transmission. The self-coherent detector module comprises an optical filter unit, a detection unit for detecting an amplitude component of an optical input, and digital signal processing circuitry configured to retrieve a phase component of the optical input from the amplitude component. The method comprises the steps of:

(i) receiving a first dataset comprising a plurality of training signals and associated response targets, wherein the training signals correspond to digital reconstructions of a first set of optical inputs and the associated response targets correspond to a second set of optical inputs, wherein optical inputs of said first set of optical inputs are output signals of the optical filter unit, generated in response to distorted versions of a corresponding first set of optical transmission signals, wherein optical inputs of said second set of optical inputs are undistorted versions of said first set of optical transmission signals, and wherein said digital reconstructions of optical inputs include the amplitude component detected by the detection unit and the phase component retrieved by the digital signal processing circuitry in respect of each optical input;

(ii) computing updates of adjustable filter coefficients of the optical filter unit that lower an approximation error between the training signals and associated response targets of the first dataset;

(iii) replacing the digital reconstructions of the first set of optical inputs by the digital reconstructions of a third set of optical inputs, thus updating the training signals of the first dataset, wherein optical inputs of said third set of optical inputs are output signals of the optical filter unit, generated in response to the distorted versions of the first set of optical transmission signals, using the updated filter coefficients of the optical filter unit;

(iv) iterating steps (ii) to (iii);

(v) generating control signals for setting the filter coefficients of the optical filter unit according to the computed updates.

An initial set of filter coefficients is determined by:

(vi) receiving a second dataset comprising a plurality of training signals and associated response targets, wherein the training signals of the second dataset are output signals of the optical filter unit, generated in response to distorted versions of a second set of optical transmission signals, and wherein the response targets associated with the training signals of the second dataset comprise undistorted versions of said second set of optical transmission signals;

(vii) computing filter coefficients of the optical filter unit that lower an approximation error between the training signals and associated response targets of the second dataset.

Initializing the filter coefficients in a non-arbitrary and non-random fashion, but determining their values purposefully, improves the convergence properties and convergence speed of the training method. As a result, the training of the filter coefficients of the self-coherent detector module can be performed faster, thus allowing incremental learning on hardware-implemented detector modules. Moreover, pre-training the filter coefficients to obtain a good point of departure for the subsequent learning phase of the filter coefficients, which uses the first dataset, ensures that a global minimum for the approximation error is found; suboptimal solutions that correspond to local minima are discarded.

In embodiments of the invention, the digital reconstructions of optical inputs preferably is a reconstitution of the waveform associated with the optical input in the digital domain, including reconstituting amplitude and phase components. The filter coefficients associated with the adjustable optical filter unit are typically complex-valued.

In embodiments of the invention, the first dataset may be derived from the second dataset, sharing the same underlying set of optical transmission signals.

It is a further advantage of embodiments of the invention that learning to accurately perform the signal recovery task, e.g. the task of linear and/or nonlinear channel equalization, is data-assisted. This leads to a flexible learning approach: the training method can be implemented with respect to different hardware implementations of self-coherent detector modules, for instance detector modules of the Kramers-Kronig type which implement the Bode gain-phase relations, or equivalent relations, in the digital domain.

The optical transmission signals of the first and second set of optical transmission signals may be single-sideband modulated signals that include a carrier wave. The carrier wave to sideband signal power ration is preferably larger than one. This has the advantage that the self-coherent detector module is capable to extract the phase information more accurately from the detected amplitude information, leading to more efficient training and better training outcomes. In embodiments of the invention, the optical phase component is thus not lost after detection and can be used to transmit information more densely. A further benefit is that self-coherent detector modules can be operated in the direct detection configuration, requiring only a single photodetector (per polarization mode), but still capable of fully reconstructing the coherent optical input signal. This enables the use of cheaper and less complex optical receiver modules in communication systems that transmit data at high rates with little additional hardware cost, e.g. in inter- and intra-data center applications. The carrier wave may be transmitted together with the single sideband signal, or may be regenerated by the self-coherent detector module and added to the single sideband signal.

In preferred embodiments of the invention, the optical transmission signals are phase-and/or amplitude-modulated telecommunication signals and the communication channel comprises an optical fiber. It is an advantage of embodiments of the invention that optical transmission signals that use complex quadrature-amplitude modulation schemes can be recovered reliably, even at elevated baud rates.

It is an advantage of embodiments of the invention that part of the signal processing can be performed in the optical domain by the optical filter unit. This reduces the complexity and cost related to the digital signal processing circuitry. Yet, the proposed training method takes the digital processing steps into account when determining the optimal set of filter coefficients, which ensures that solutions are optimal.

It is an advantage of embodiments of the invention that linear as well as nonlinear distortion effects in a communication system comprising the self-coherent detector module can be addressed by the training method. Optical signals may thus be transmitted at higher optical power over the communication channel, which is beneficial for the optical signal to noise ratio at the photodetector.

According to some embodiments of the invention, the training method may further comprise upsampling of an electronic signal that is output by the detection unit of the self-coherent detector module. It is an advantage of embodiments of the invention that an upsampling factor can be reduced, e.g. compared to self-coherent Kramers-Kronig receivers that are known in the art.

In embodiments of the invention, the steps of the training method may be performed by a processing apparatus that is provided externally to the self-coherent detector module and/or a processing device that forms part of the self-coherent detector module. For instance, some of the steps of the training method are performed by the external processing apparatus, while the remaining steps of the training method are performed by the processing device in the self-coherent detector module. The self-coherent detector module may be configured to communicate and exchange data with an external processing apparatus.

In embodiments of the invention, the training method may further comprise the step of receiving (e.g. loading) a simulation model of the self-coherent detector module, and step (ii) includes executing a digital error backpropagation algorithm to propagate the approximation error back through the simulation model of the detector module. In addition to the simulation model of the self-coherent detector module, the transmission of the optical signals may also be simulated in software, e.g. to prebuild the first and second dataset, or obtain optical transmission signals as inputs to the self-coherent detector module to facilitate the generation of the first and second dataset.

According to some embodiments of the invention, the training method may further comprise the step of loading a simulation model of the detector module, wherein receiving the first dataset in step (i) and/or receiving the second dataset in step (vi) includes simulating signal passes of the distorted versions of the optical transmission signals through at least a portion of the simulation model of said detector module.

Learning the filter coefficients with respect to a simulation model of the self-coherent detector module has the advantage that model parameters (e.g. of the self-coherent detector module, the communication channel, the transmitter) can be investigated more easily. Moreover, transfer learning can be used to refine the set of filter coefficients that has been learnt on a simulation model of the self-coherent detector module to run more accurately on a hardware implementation of the same self-coherent detector module.

In embodiments of the invention, receiving the first dataset in step (i) may include loading measurement data relating to the self-coherent detector module, wherein the measurement data comprises the digital reconstructions of the first and second set of optical inputs.

In embodiments of the invention, recovered transmission signals may also be classified, e.g. by a decision unit of the self-coherent detector module.

According to some embodiments of the invention, control signals for setting the filter coefficients of the optical filter unit according to the computed updates may be generated, in step (v), after each iteration in step (iv). This is useful when training a hardware implementation of the self-coherent detector module with measured training data. If a software implementation of the self-coherent detector module, e.g. a simulation module, is being trained, for instance, with synthetic/simulated training data, control signals for setting the filter coefficients of the optical filter unit according to the computed updates may be generated, in step (v), when the iterations of step (iv) have ended.

According to some embodiments of the invention, the filter coefficients of the optical filter that were last updated before the iteration ends, may be stored on a computer-readable medium and then reloaded from the computer-readable medium by the self-coherent detector module. The control signals for setting the filter coefficients of the optical filter unit may then be generated in accordance with the filter coefficients as loaded into the self-coherent detector module. The control signals may be applied to the optical filter unit in an additional step, whereby weighting elements of the optical filter units are adjusted according to the filter coefficients. Such embodiments have the advantage that the training and control steps may be performed separately by different processing devices. For instance, training steps (i)-(iv) and (vi)-(vii) may be performed remotely with respect to the self-coherent detector module, whereas control step (v) is performed by a control unit that is comprised by the self-coherent detector module. Training steps may be executed faster and/or more efficiently when performed remotely, e.g. on dedicated training hardware. A same central or distributed processing apparatus for remote execution of the training steps (i)-(iv) and (vi)-(vii) may be used with respect to a plurality of different self-coherent detector modules that are trained in accordance with embodiments of the invention.

In another aspect, the present invention relates to a computer program with instructions which, when executed by a computer, cause the computer to execute the steps of training method.

The present invention also relates to a computer-readable medium having stored thereon the computer program.

In another aspect, the present invention relates to a self-coherent detector module that comprises an optical filter unit with adjustable filter coefficients for generating a filtered optical signal in response to an optical input signal, a detection unit for detecting an amplitude component of the filtered optical signal, digital signal processing circuitry configured to retrieve a phase component of the filtered optical signal from the detected amplitude component, and means for carrying out the steps of the training method.

The optical filter unit of the self-coherent detector module may comprise a signal mixing unit composed of interconnected delay lines, and a plurality of readout taps connected to respective terminals of the delay lines. Alternatively or additionally, the optical filter unit of the self-coherent detector module may include a plurality of ring resonators whose filter bands are offset relative to each other. The optical filter unit of the self-coherent detector module may have a plurality of readout taps, wherein different readout taps have different delays.

In yet another aspect, the present invention relates to a training method for performing signal distortion compensation in a self-coherent detector module. The self-coherent detector module comprises digital signal processing circuitry configured to retrieve phase information from detected amplitude information relative to an optical signal applied to the self-coherent detector module. The method comprises the steps:

(i) distorting a pristine optical signal, thus obtaining a distorted optical signal;

(ii) subjecting the distorted optical signal to an optical filter unit of the detector module, thus obtaining a filtered optical signal, wherein obtaining the filtered optical signal comprises extracting a plurality of signal portions from the distorted optical signal, weighting the extracted signal potions by respective filter coefficients and combining the weighted signal portions into the filtered optical signal;

(iii) detecting the amplitude of the filtered optical signal and the pristine optical signal;

(iv) retrieving the phase of the filtered optical signal and the pristine optical signal from the detected amplitude of the filtered optical signal and the pristine optical signal, respectively, thus obtaining a digitally reconstruction of the filtered optical signal and a digitally reconstruction of the pristine optical signal;

(v) generating an error signal indicative of an approximation error between the digital reconstruction of the filtered optical signal and the digital reconstruction of the pristine optical signal;

(vi) adjusting the filter coefficients based on the error signal;

(vii) repeating steps (i) to (vi) for each one of a first plurality of pristine optical signals. Furthermore, an initial set of filter coefficients is determined by:

(viii) executing steps (i) to (ii) for each one of a second plurality of pristine optical signals;

(ix) generating an error signal indicative of an approximation error between the filtered optical signals obtained in step (viii) and the respective pristine optical signals of the second plurality of pristine optical signals;

(x) adjusting the filter coefficients based on the error signal generated in step (ix).

The second plurality of pristine optical signals may be identical to the first plurality of pristine optical signals.

In embodiments of the invention, detecting the amplitude of the filtered and the pristine optical signal may include detecting the respective optical signal in a photodetector of the detector module, thus generating an electronic signal, and further sampling the electronic signal and digitizing the sampled electronic signal. Retrieving the phase of the filtered optical signal and the pristine optical signal may comprise applying the Bode gain-phase relation to the detected amplitude of the filtered optical signal and the pristine optical signal, respectively.

Embodiments of the invention may further comprise the step of estimating the amplitude and phase components of the weighted signal portions before combining stem, e.g. the weighted optical signals present in the readout taps of the optical filter unit prior to detection by the detection unit.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
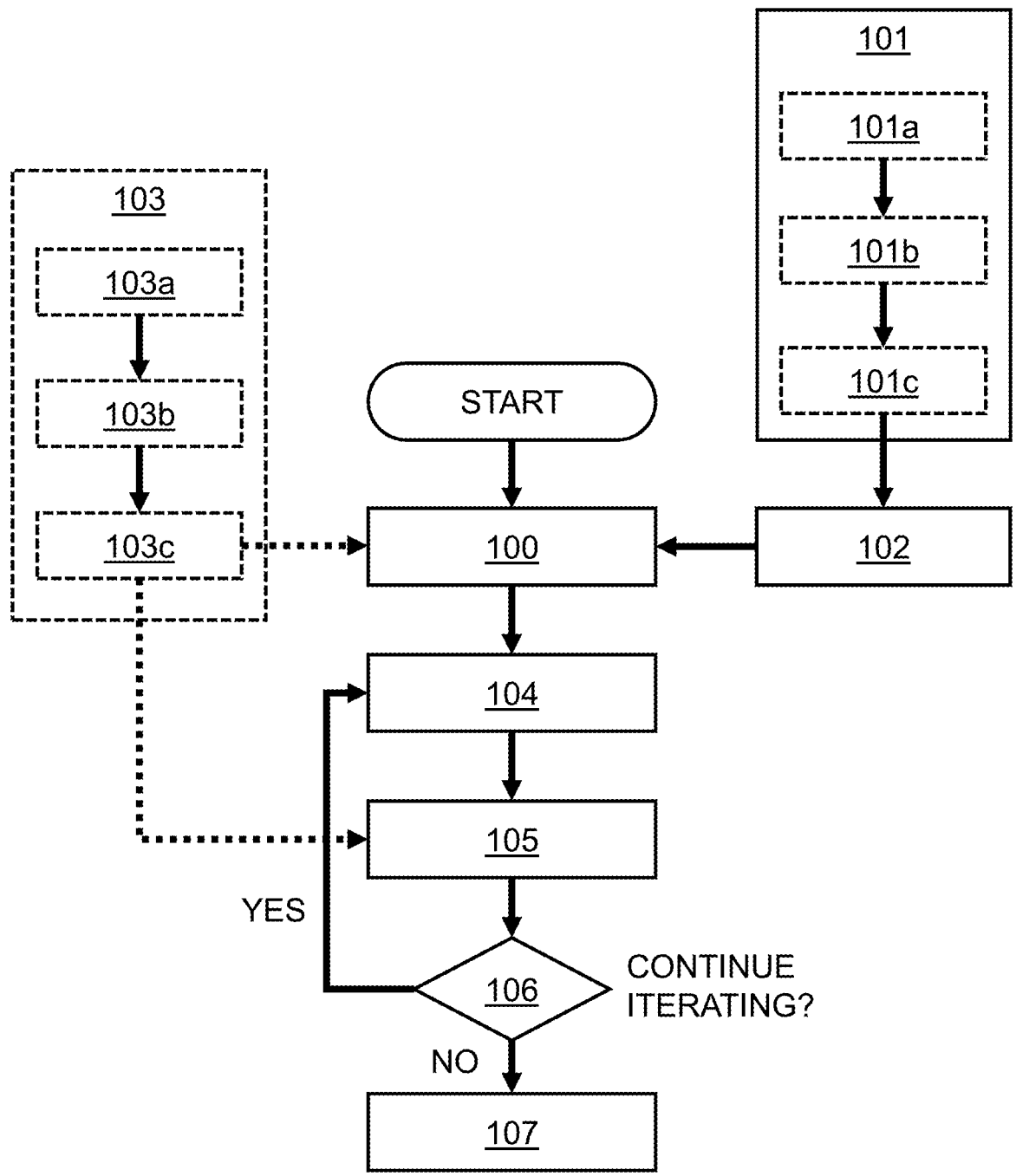
FIG. 1 is a flowchart explaining the steps of training an optical detector module to perform recovery of distorted transmission signals, in accordance with embodiments of the invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

When referring to the recovery of distorted optical transmission signals, what is meant is the restoration of the transmission signal to its pristine or undistorted state relative to a particular distortion mechanism, or a combination of such distortion mechanisms. In the field of telecommunication, this is also termed channel equalization, which can include linear and/or nonlinear effects. A digital reconstruction of a transmitted optical signal, received by a self-coherent optical detector module trained to perform signal recovery, or a further processed version thereof, is considered a faithful reproduction of the transmission signal in its pre-distorted condition. In other words, a digital reconstruction of a transmitted optical signal in a self-coherent optical detector module trained to perform signal recovery, or a further processed version thereof, aims at preserving the actual waveform of the transmission signal, i.e. the waveform that is not subjected to distortions.

In a first aspect, the invention relates to a computer-implemented training method that learns a self-coherent detector module to recover distorted optical transmission signals. An adequate class of optical detector modules which can be trained by this method, i.e. learn how to recover distorted transmission signals, requires at least the following components: an adjustable or adaptive optical filter unit that generates a filter output signal in response to an applied optical input signal, a detection unit for direct detection of an amplitude component of the filter output signal, and digital signal processing (DSP) circuitry configured to retrieve a phase component of the filter output signal based on its detected amplitude component. Adjustable weighting elements of the optical filter unit are preferably arranged in respective readout taps or channels, which can be coherently combined to provide a filtered output signal. A detector module of this kind is described in further detail below, with reference to FIG. 2.

The separate steps of the training method are now described with reference to FIG. 1. In step 100, a first dataset is provided which contains a plurality of training signals and associated response targets. Providing the first dataset includes loading a pre-built dataset from a storage unit and/or generating the training sequences of the first dataset on demand. A pre-built first dataset can be updated or enlarged by the generation of new training sequences.

Figure 5:
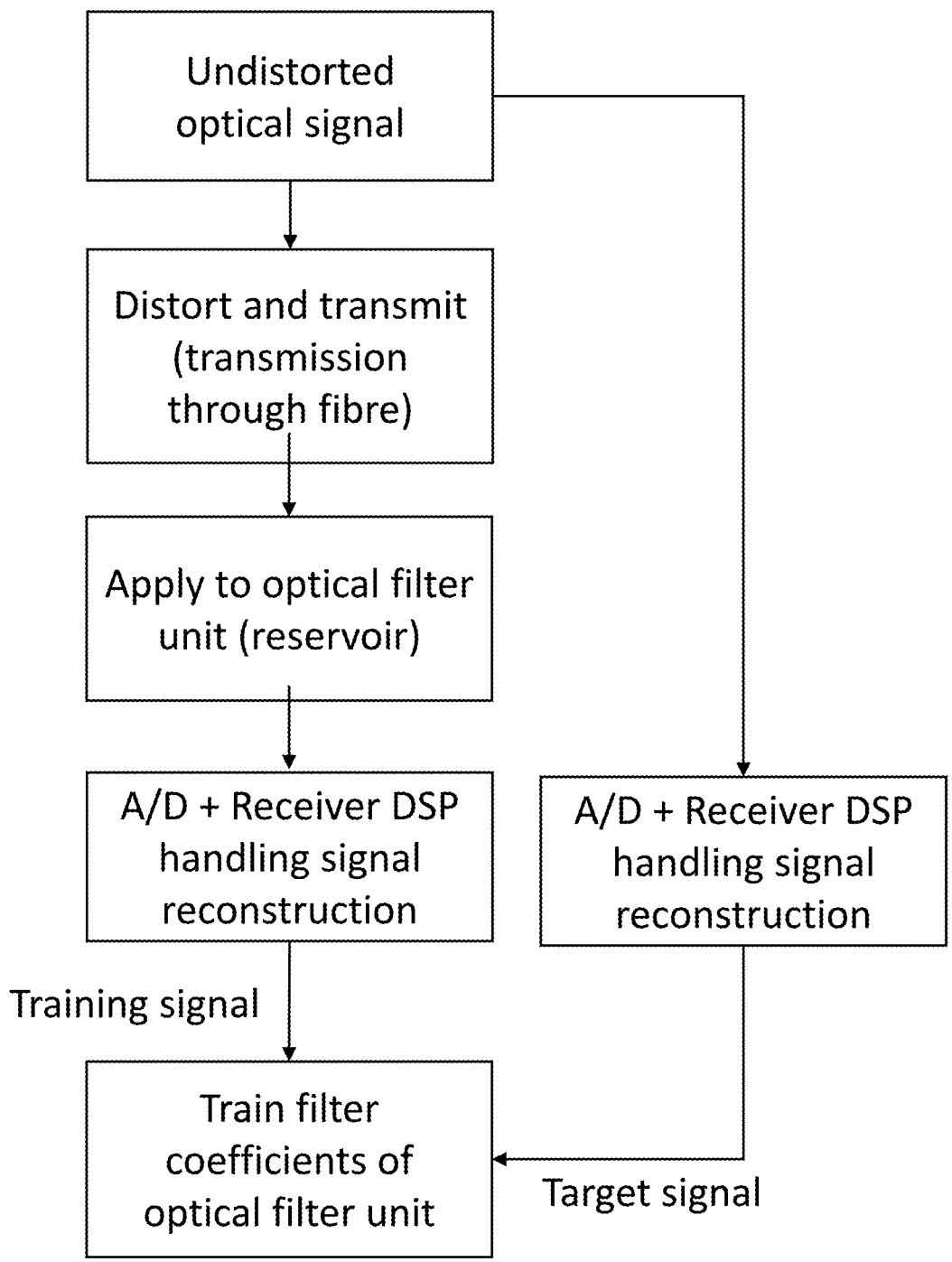
FIG. 5 and FIG. 6 explain the generation of training data of the first and second dataset respectively, which can be used in training methods according to the invention.

Typically, the training signals and response targets are arranged pairwise into training instances, such that the desired input-output behavior, e.g. recovering clean optical transmission signals from their distorted counterparts, can be inferred from the sequence of training instances. Although the particularities of the training signals and associated response targets depend on a variety of factors, including the chosen transmission channel, the distortion mechanism of interest, and the implementation of the detector module in hardware or software, a commonality between all training signals and response targets of the first dataset is that they relate to digital reconstructions of filtered signals that are derived from optical transmission signals. More specifically, each training signal of the first dataset relates to a distorted version of a corresponding optical transmission signal that has been filtered by the optical filter unit and digitally reconstructed in the DSP circuitry of the optical detector module, whereas the response target associated with the training signal relates to a pristine, e.g. undistorted, version of the same optical transmission signal that has been digitally reconstructed in the DSP circuitry of the optical detector module, without having been subjected to optical filtering in the optical filter unit. In other words, the difference between the training signal and the associated response target of each training instance is that the training signal considers distortions of the pristine transmission signal and the response target omits or bypasses the filter process in the optical filter unit. A schematic flowchart illustrating the generation of training signals and associated response target as training data samples of the first dataset is shown in FIG. 5.

Here, a digital reconstruction of an optical input (e.g. optical input signal) refers to a faithful representation of the optical input in the digital domain, e.g. comprising amplitude and phase information with regard to the optical input. Given that the class of optical detector module considered in this application are self-coherent detector modules that are based on direct detection of the intensity of an optical input signal, it is necessary to reconstruct the phase component of the input signal from the available amplitude component (square root of signal intensity) after detection. The digital reconstruction may correspond to the direct output of a signal reconstruction block, e.g. running a phase retrieval algorithm and combining the retrieved phase information with the detected amplitude information, or a further processed version thereof, provided that the originally determined phase and amplitude information is not lost and a faithful representation of the optical input still possible. Further processing may include operations such as digital upsampling or downsampling of the signal, sliding average or signal smoothing, rescaling of the signal and keeping track of the scaling factor, nonlinear signal transformation by a given invertible nonlinearity function, signal compression with a given reversible compression algorithm.

The optical transmission signals, distorted or undistorted, considered in embodiments of the present invention preferably are transmission signals that use single-sideband modulation, e.g. optical signals that derive from a baseband-modulated optical carrier wave and for which only one of the sidebands (upper and lower) is transmitted. Digital or analog information to be transmitted is encoded by an optical transmitter which applies the encoded data stream as a baseband signal for driving the modulator. The optical carrier wave may be transmitted together with the single sideband, or is suppressed during signal transmission. In the former case, the reduced carrier wave, or an amplified version thereof, is maintained at the transmitter side and supplied to the optical transmission channel together with the single sideband. Devoting more signal power to the carrier wave decreases the transmitter efficiency, but has the advantage that the carrier for demodulation can be easily recovered, e.g. by filtering techniques. In the latter case, the carrier wave is not transmitted over the transmission channel, thereby increasing the transmitter efficiency and reducing nonlinearity impairments in the channel, but accurate estimation of frequency and phase of the carrier wave in the carrier recovery circuit of the optical receiver is a far more complex task. Single-sideband modulated optical transmission signals with a strong carrier, i.e. a carrier that is dominant over the single transmitted sideband in terms of signal power, are known to be minimum-phase signals and have the advantage that self-coherent optical detector modules, e.g. self-coherent optical receivers of the Kramers-Kronig type, can reliably reconstruct the optical phase information from the intensity of the transmitted optical signal in direct-detection systems. It has been found, however, that even optical transmission signals which are single-sideband modulated and have a less prominent carrier wave component, e.g. slightly violating the minimum-phase condition, can be recovered reliably by a self-coherent optical detector module trained in accordance with embodiments of the invention.

Embodiments of the invention may include the optional step 103 of building the first dataset that is used for training. Step 103 may be performed before the training method is executed so that a pre-built first dataset is available on and can be loaded from a storage unit. Alternatively, step 103 may be performed at the same time the training method is executed so that fresh training instances of the first dataset are generated sequentially or in small batches (mini-batches) each time the training method requires new training data as input. Building the first dataset comprises creating an optical transmission signal in step 103a, distorting the optical transmission signal in step 103b, and detecting and digitally reconstructing optical transmission signals (distorted and undistorted signals for the training signals and response targets respectively) in step 103c. Distorted versions of the optical transmission signals are also filtered by the optical filter unit in step 103c, while the undistorted versions are not subjected to filtering by the optical filter unit. The optical filter unit may be bypassed or a distinct input connector used when building the first dataset in software or hardware implementations of the optical communication system.

Steps 103a-c can be performed in hardware or in software, e.g. by way of a physical implementation or a simulation model, e.g. surrogate model, of an optical communication system respectively, which system comprises an optical transmitter, the optical detector module and communication channel arranged between the transmitter and the detector module. It is possible to enlarge an existing first dataset by including synthetic training instances obtained by the simulation model into a set of measured training instances obtained by the physical implementation, and vice versa.

In the case of a software implementation, the signal creation step 103a may include simulating an amplitude and/or phase modulation process of an optical carrier wave, e.g. modelling the output signals of an externally modulated laser in an optical transmitter, while the distortion step 103b alters the modulated optical signal in a way to reflect the imperfections of a particular communication channel selected for transmission. For instance, transmission of the modulated optical signal in a non-ideal fiber channel may be reflected in simulation by numerical analysis that considers propagation of the optical signal in the presence of chromatic dispersion and/or fiber nonlinearity, e.g. including self-phase modulation. Especially fiber nonlinearity becomes more significant in the event of a strong carrier wave that is co-propagating with the modulation sideband. Step 103c may include modelling of the optical filter unit, modelling of a front-end section of the optical detector module, e.g. including a photodetector model and a digitization model, and simulating the DSP circuitry of the optical detector module. A more detailed example of the individual signal processing steps in a software implementation of the optical detector module is given further below. A software implementation has the benefit that some imperfections along the transmission path can be investigated independently of others, e.g. chromatic dispersion and fiber nonlinearity can be studied as two independent distortion mechanisms. Furthermore, non-ideal transfer functions of the modulator in an optical transmitter, also causing distortion effects, can be selectively added to the simulation model in the same way as the influence of noise and imperfections in the signal path of the optical detector module.

Similarly, a physical implementation of the optical transmitter, communication channel and optical detector module is a suitable means for achieving amplitude and/or phase modulation of an optical carrier wave in the signal generation step 103a, signal distortion in step 103b, and signal detection and digital reconstruction in step 103c. Signal distortion in particular is a simple matter of actually transmitting the modulated optical signal over the communication channel. Precautionary measures may be taken during generation of the optical signals to be transmitted, or additional component placed in the communication channel, to ensure that a specific distortion mechanism predominates when the training method is carried out. For example, signal pre-emphasis or nonlinear (digital) pre-distortion of transmitter components may be applied to the baseband signal that is used for modulating the optical carrier wave, dispersion compensation modules or a piece of dispersion compensating fiber may be used to reduce chromatic dispersion distortion effect in a fiber link, adaptive optics may be used to correct or reduce optical aberrations in free-space communication systems, a reduced optical carrier may be amplified at the end of the communication channel, prior to detection in the optical detector/optical receiver module, to reduce nonlinearity impairments in the channel, etc.

In consequence, both software and hardware implementations of a communication system allow the investigation of a specific primary distortion effect that prevails, in magnitude (e.g. distorted signal power), over other secondary distortion effects. In the context of the present invention, any reference to the distorted version of an undistorted or pristine optical transmission signal is thus understood as an optical transmission signal subjected to the primary source of distortion. This does not preclude the fact that the pristine optical transmission signal is not itself affected by a weaker, secondary source of distortion. The terms "distorted version" and "undistorted version" are relative to the predominant distortion effect in respect of which signal recovery by the optical detector module is trained.

Steps 101 and 102 are directed to the finding of an initial set of filter coefficients that serves as a seed for the iterative optimization of filter coefficients in the subsequent steps 104 through 106. It has been found that training the self-coherent optical detector module to perform the signal recovery task led to unsatisfying results if the initial filter coefficients are determined in an arbitrary or random manner. Error metrics, suitable for measuring the approximation quality between the recovered transmission signal after training and the corresponding response targets of a test dataset, failed to converge to a global minimum when filter coefficients were randomly drawn. Yet, a random initialization of training weights is a standard choice in the field of machine learning.

Accordingly, embodiments of the invention selects the initial set filter coefficients purposefully by pre-training them on a related signal recovery task. More specifically, a second dataset is provided in step 101, which is used for determining the initial filter coefficients in step 102. As mentioned in respect of the first dataset, also the second dataset may be provided by loading a pre-built dataset from a storage unit and/or generating the training sequences of the second dataset on demand. In some embodiments of the invention, a single dataset may be built and shared, i.e. the steps 101 and 103 are performed at the same time to gather training instances of a training dataset which can be used as first dataset and second dataset. The related signal recovery task on which the filter coefficients are pre-trained consists in approximating the pristine optical transmission signal, e.g. the undistorted version, by the filtered version of the distorted transmission signal, just before the opto-electronic conversion process inside the optical detector module. That is, the output signal of the optical filter unit that is generated in response to the distorted optical transmission signal is trained to reproduce the pristine optical transmission signal before it is received in the photodetector of the optical detector module. Therefore, the training signal of each training instance of the second dataset corresponds to the distorted and filtered version of an optical transmission signal, wherein filtering is performed by the optical filter unit, and is associated with a response target that corresponds to the undistorted version, e.g. pristine, optical transmission signal. It is thus possible to derive the training instances of the first and second dataset from a same underlying set of optical transmission signals. Nonetheless, first and second dataset may be derived from different sets of optical transmission signals.

Figure 6:
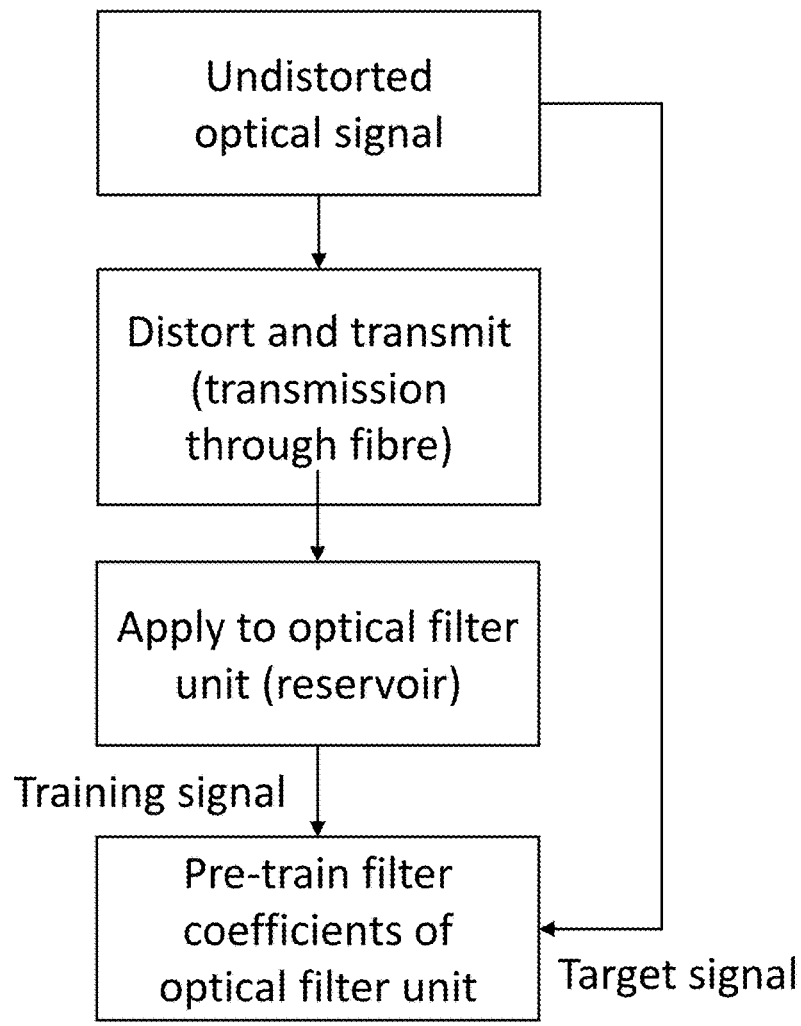

Building the second dataset comprises creating an optical transmission signal in step 101a, distorting the optical transmission signal in step 101b, and filtering the distorted optical transmission signals by the optical filter unit in step 101c. Steps 101a-c can be performed in hardware or in software, analogously to steps 103a-c, with the exception that step 101c is limited to the action of the optical filter insofar as the generation of training signals is concerned and even absent in the generation of the associated response targets. A schematic flowchart illustrating the generation of training signals and associated response target as training data samples of the second dataset is shown in FIG. 6.

The initial set of filter coefficients are then computed from the second dataset in step 102, e.g. through a supervised learning or a reinforcement learning approach. Computing the initial filter coefficients typically comprises evaluation of a loss function (also referred to as cost function, error function or objective function) and running of an optimization algorithms as sub-steps. A commonly used loss functions is the mean square error (MSE). It can be used in embodiments of the invention, where it is easily extendable to complex-valued signals and has the advantage of admitting a closed-form solution if optimization is achieved under a linear regression algorithm, e.g. ridge regression. Embodiments that rely on a linear regression algorithm use the plurality of (unweighted) optical readout signals in the readout taps of the optical filter unit as independent regression variables. These readout signals can be obtained in a straightforward manner in a simulation model of the optical filter unit and can be estimated in case of a hardware-implemented optical filter unit. One suitable estimation technique has been described in patent application EP3631695A1•(2020 Apr. 8), but other methods of estimating the readout signals may equally be used. Alternatively, heuristic optimization algorithms may be used to find the initial set of filter coefficients, e.g. particle swarm optimization, simulated annealing, differential evolution, genetic or evolutionary algorithms.

Once the initial set of filter coefficients are determined, the filter coefficients are optimized for the signal recovery task in respect of the complete transmission path, including detection and digital reconstruction of the optical transmission signals in the optical detector module. This optimization is achieved iteratively, using the first dataset and new training signals derivable therefrom. Updates of the filter coefficients are computed from the first dataset in step 104 at the beginning of each next iteration step, e.g. using a supervised learning or a reinforcement learning approach. Computing the updates typically comprises evaluation of a loss function and running of an optimization algorithms as sub-steps. The search space of the optimization algorithm is defined by the number and the dimensionality of the filter coefficients, while the loss function expresses the fitness of each candidate set of filter coefficients that the optimization algorithms generates at each iteration. The search space and the computation time required for exploring the search space can be advantageously reduced if an optical filter unit with fewer readout taps is used and/or the possible values taken by the individual filter coefficients are restricted to a finite set (i.e. discrete filter coefficients instead of continuous-valued coefficients). Various optimization algorithms that are known in the art can be adapted to the specific optimization problem at hand.

The loss function thus evaluates how well the detector module has learnt to estimate or approximate the response targets for a given number of training instances. A commonly used loss functions is the mean square error (MSE). It can be used in embodiments of the invention, where it is easily extendable to complex-valued signals and has the advantage of being differentiable. A differentiable loss function is preferred in embodiments of the invention that use a digitally implemented error backpropagation algorithm that propagates the approximation error back through the signal processing chain of the optical detector module, e.g. an error backpropagation as known in the field of training artificial neural networks. Such a digital error backpropagation algorithm can be implemented in software or in hardware, using measured and/or estimated parameters and transfer characteristics that describe a reverse signal pass through the optical detector module under operating conditions. The error backpropagation algorithm is preferred as is resource-friendly (e.g. no vast set of candidate solutions required) and easily adaptable to stochastic gradient descent search on small batches of training signals. Hence, the error backpropagation algorithm can be deployed in training methods that run online and require a little power budget. Alternatively, heuristic optimization algorithms may be used to find updates to the filter coefficients, e.g. particle swarm optimization, simulated annealing, differential evolution, genetic or evolutionary algorithms. In embodiments using heuristic optimization algorithms, search candidate solutions can be explored in a restricted volume of the search space that is centered around the pre-trained set of filter coefficients.

Once the filter coefficient updates have been determined successfully, the first dataset is modified in step 105 so that the updated filter coefficients of the optical detector module are taken into account during the next iteration. The modification of the first dataset comprises replacing the training signals by new training signals that reflect the altered response characteristics of the optical filter unit under changing filter coefficients. Hence, using the updated filter coefficients of the optical filter unit, new training signals are created that correspond to the digital reconstruction of the filtered optical signals as generated by the adjusted filter unit, in response to the distorted version of the respective optical transmission signals. The new training signals can be monitored in software, or measured in hardware. Each time a new training signal is requested by the training method, the steps 103a-c are carried out. Alternatively, steps 103a-b are carried out once for the predetermined set of transmission signals and are recorded and saved. In this case, only step 103c is carried out each time a new training signal is requested by the training method, using the previously recorded transmission signals as inputs.

Alternatively, a new training signal may be selected directly from a large first dataset, provided annotations to the training signals are available which specify the set of filter coefficients in respect of which the respective training signal has been generated. A pre-built first dataset can be large and provide sufficient samples of the space of allowable filter coefficients to which the filter coefficients of the requested new training signal can be compared, e.g. using a distance metric. A training signal of the first dataset may then be selected if its associated set of annotated filter coefficients best matches the set of filter coefficients associated with the requested new training signal. For instances, the closest set of annotated filter coefficients associated with a training signal of the first dataset may be selected. In a variant, interpolation between training signals corresponding to different sets of filter coefficients, but associated with the same optical transmission signal, may be used to generate the new training signal. Large pre-built dataset are preferably stored in a database, in which training signals can be queried via their annotated set of filter coefficients.

At decision point 106, the method decides whether a new iteration cycle is started or the iterative process stopped. In case the iteration ends, a final set of filter coefficients is obtained from the preceding update of filter coefficients. Taking the decision to continue or abort the iterative updating process may include comparing the current approximation error indicated by the loss function to a predetermined minimum error (e.g. target error for early stopping) and/or comparing the number of currently completed iteration steps to a predetermined number of iteration steps. The predetermined minimum error may be related to some other signal quality measure, e.g. the bit error rate for which forward error correction (FEC) techniques can still be applied successfully without requiring retransmission of frames in the context of optical fiber communication applications.

Control signals for adjusting the weighting elements of the optical filter unit according to the final set of filter coefficients are generated in step 107. These control signals can be output and applied to the optical filter unit (hardware implementation), where they set the weighting elements according to the final set of filter coefficients. As a result thereof, the optical detector module will be configured to perform signal recovery of distorted optical transmission signals. In a software implementation, the final set of filter coefficients and/or corresponding control signals may be stored in a memory unit that can be accessed by a hardware-implemented optical detector module. The optical filter unit, or a processing unit or controller of the optical detector module that controls the optical filter unit, is capable of reading the final set of filter coefficients and/or corresponding control signals from the memory unit, which may be external to the optical detector module, and set the weighting elements accordingly.

A training method in accordance with the invention learns incrementally and is performed online, since training instances of the first dataset depend on the current set of filter coefficients and are generated dynamically or selected from a comprehensive dataset with filter coefficient annotations as a function of time. Multiple iterations are usually required before the set of filter coefficients converges to an optimal solution. Having regard to the initial set of filter coefficients, online or offline learning can be implemented, since the initial filter coefficients can be determined in a single iteration step, e.g. if a closed-form solution is available or if the whole second dataset can be loaded at once. The training method may be executed by a processing unit that is part of the optical detection module, a processing unit that is external to the optical detection module, or by multiple communicating processing units in the context of parallel training in a distributed environment. The processing unit of the optical detection module may communicate with another processing unit that is external to the optical detection module. Pre-built first and second datasets may be stored in a database or on a computer-readable medium, e.g. a computer memory unit, e.g. a memory chip, from which they can be accessed during training. Computer memory units storing the first and second datasets may be part of the optical detection module, e.g. part of its DSP chip, or provided as external memory units, e.g. hard drives, on data servers, etc.

In some embodiments of the invention, the training method is interacting with a controller of the optical detection module, which is adapted to control the different components of the optical detector module to acquire fresh training signals and/or response targets. For instance, the controller may be adapted to control the detection unit of the optical detector module to perform an amplitude measurement of an optical input, control the DSP circuitry to perform a phase retrieval, control the bypassing or the selective coupling regime of the optical filter unit, control the setting of the adjustable weighting elements of the optical filter unit, etc. Optionally, the controller may be adapted to request multiple passes of the same distorted or undistorted version of the optical transmission signal and alternate the adjustable weighting elements of the optical filter unit according to scan sequence that allows estimation of optical readout signals in the respective readout channels of the optical filter unit (e.g. as described in patent application EP3631695A1). This way, the optical detection module can be operated in a signal acquisition mode that generates new training signals or new training instances (i.e. pair of training signal and associated response target). Acquired training signals or training instances may be stored locally in a memory unit of the optical detector module and/or sent to an external processing device, e.g. via an I/O block of the optical detection module, a wired or wireless communication unit of the optical detection module, etc. For instance, an external processing device programmed to execute the training method may request a new training signal from the optical detection module each time it executes step 104.

In a second aspect, the present invention relates to a method of recovering distorted transmission signals that is performed by self-coherent optical detector module. The optical detector module is of the same type as described in relation to the first aspect. As explained before, distorted optical transmission signals relate to optical transmission signal that are affected by a primary source of distortion along the transmission path, e.g. located in an optical transmitter or an optical communication channel. Naturally, training can be performed, subsequently or at once, for a combination of distortion mechanisms and the signal recovery method cope with this combination of distortion mechanisms. The signal recovery method comprises:

subjecting a distorted optical transmission signal to the optical filter unit, thus generating a filter output signal,
detecting an amplitude component of the filter output signal, digitally reconstructing the filter output signal by retrieving a phase component from the detected amplitude component of the filter output signal and combining the amplitude component and the phase component into a faithful representation of the filter output signal, wherein the adjustable filter coefficients of the optical filter unit are set to the final set of filter coefficients obtained at the end of the training method, e.g. by applying the generated control signals that represent the final set of filter coefficients to the weighting elements of the optical filter unit.

Embodiments of the second aspect of the invention are advantageously executed by the hardware-implemented optical detector module in respect of which the training method has been carried out. That is, training instances of the first dataset used in the training method relate to the same hardware-implemented optical detector module, or a simulation model of the optical detector module built in software. This ensures that distorted optical transmission signals will be recovered reliably. Nonetheless, it is also possible to execute embodiments of the second aspect by a hardware-implemented optical detector module that is different from the optical detector module in respect of which the training method has been carried out. In this case, the signal recovery may be suboptimal, but this can be remedied by retraining the filter coefficients over a few iteration cycles, using a transfer learning approach. According to this approach, the set of filter coefficients does not need to be trained from scratch; instead, they are initialized according to the final set of filter coefficients as determined by the training method.

The present invention also relates to a processing device that is adapted to carry out the steps of the training method as described above, with a particular focus on a processing unit contained in the optical detector module in respect of which the training method has been performed. An optical detector module with such a processing unit is also capable of performing the method steps of embodiments of the second aspect, i.e. actually performing recovery of optical transmission signals when the optical detection module is operative. An example of an optical detector module of this kind is now described with reference to FIG. 2.

Figure 2:
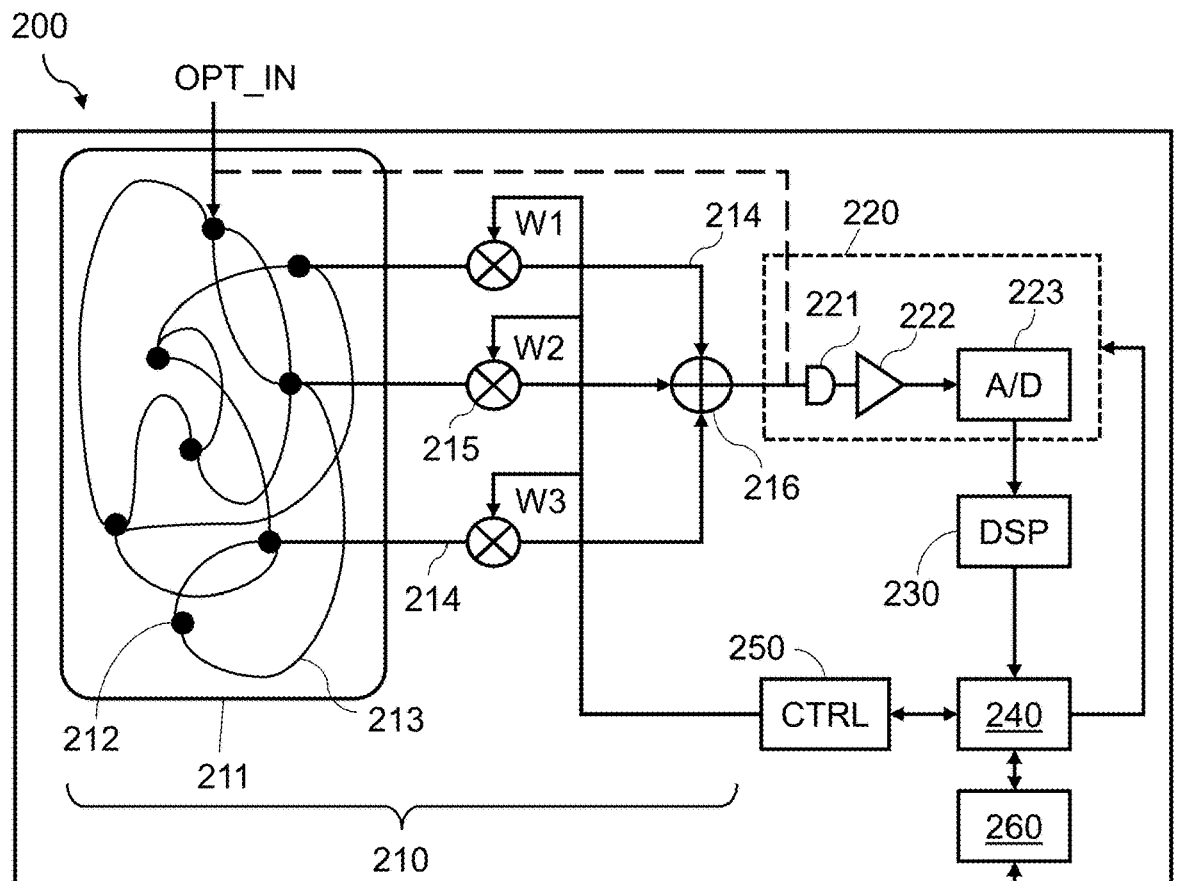
FIG. 2 shows an architecture of an optical detector module, which can trained by training methods according to the invention.

The optical detector module 200 of FIG. 2 comprises an adjustable optical filter unit 210, a front-end section 220 and DSP circuitry 230, e.g. a DSP chip. The optical filter unit 210 is configured to generate a filter output signal in response to an optical input signal, OPT_IN. Moreover, the optical filter unit 210 may comprise a network 211 of interconnected optical delay lines 213 (e.g. multi-arm interferometer), which "mixes" the received input signal OPT_IN: delayed copies of the received input signal OPT_IN are superimposed at the various nodes 212 of the network 211, which interconnect two or more of the delay lines 213. The phase differences associated with the different delay lines 213 are usually random. Several of the interconnection nodes 212 of the network 211 act as signal taps, allowing extraction of a fraction of the mixed input signal OPT_IN. In one particular embodiment, a passive photonic reservoir, e.g. as described by Vandoorne, K., et al. "*Experimental demonstration of reservoir computing on a silicon photonics chip*", Nat. Commun., vol. 5, no. 3541 (2014), may act as a mixing unit 211 for the received input signal OPT_IN, where mixed signal portions are extracted at a plurality of the reservoir nodes. A readout tap or readout channel 214 is associated with each signal tap of the network and configured to apply a complex-valued filter coefficient (W1 through W3 in FIG. 2) to the extracted portion of the mixed signal. For instance, an adjustable weighting element 215 for applying the respective filter coefficient may be provided along each readout tap 214. Each one of the weighting elements typically includes an amplitude modulator and a phase modulator, or a combined amplitude-phase-modulator. A combining structure 216, e.g. a tree-structure of optical combiners, may be used to coherently recombine the weighted signal portions into the filter output signal.

A detection unit 221, e.g. photodetector, in the front-end section 220 of the optical detector module is configured to receive and convert the filter output into an electronic signal which is representative of the amplitude of the filter output signal (the amplitude being directly derivable from the detected intensity as its square root value). In embodiments of the invention in which the carrier wave is suppressed and not transmitted together with the single sideband signal, a local oscillator may regenerate the optical carrier wave and mix it with the filter output signal in the detection unit. The optical input signal OPT_IN is received directly in the detection unit 221, when the optical filter unit 211 is bypassed.

The front-end section 220 further comprises an A/D converter stage 223 for sampling and quantifying the detected analog signal from the detection unit 221, thereby translating the detected analog signal into a digital output signal for further processing by the DSP circuitry 230. The front-end section 220 may include additional components such as, but not limited to, a transimpedance amplifier 222 (TIA), gain control circuitry in respect of the TIA, voltage gain stages, and a low-pass filter. Additional nonlinear distortions of the detected analog signal from the detection unit 221 can be caused by saturation effects in the TIA, but for some embodiments of the invention this has the benefit of reducing distortions in the transmitted optical signal.

The DSP circuitry is adapted to retrieve phase information from the detected amplitude information relating to the filter output signal, and to fully reconstruct the filtered output signal in the digital domain if the optical filter unit is operative and not bypassed. Likewise, the DSP circuitry is adapted to retrieve phase information from the detected amplitude information relating to the input signal OPT_IN, e.g. the distorted or undistorted optical transmission signal, and to fully reconstruct the input signal OPT_IN in the digital domain if the optical filter unit is being bypassed. The DSP circuitry may further be adapted to perform additional signal transformations or conditioning processes, e.g. including upsampling and/or downsampling operations, scaling and biasing operations, noise-filtering, moving average filtering, carrier removal, frequency shifting, root-raised cosine filtering, etc.

The optical detector module 200 also contains a processing unit 240 that receives the digital reconstructions of the filter output signal or the input signal OPT_IN as training signal inputs during training. The processing unit 240 is adapted to carry out the steps of the training method and send the generated control signals that are indicative of the final set of trained filter coefficients to a controller 250. The controller is configured to set the filter coefficients of the adjustable weighting elements 215 in accordance with the control signals issued by the processing unit 240. If the training method is performed by the processing unit 240 in the optical detector module 200, the processing unit preferably generates control signals in respect of the updates to the filter coefficients which are computed in each iteration and the controller 250 adjusts the filter coefficients of the weighting elements 215 accordingly. A communication or I/O block 260 of the optical detector module 200 allows data exchange with external devices. Input and output data, DATA_I/O, exchanged via the I/O block 260 may relate to, inter alia, the final and intermediate filter coefficients obtained during training, and training instances of the first and second dataset.

Existing optical detectors, e.g. self-coherent optical receivers such as Kramers-Kronig receivers, may be combined with an adjustable optical filter unit, e.g. an optical filter unit with adjustable weighting elements arranged in respective readout channels (readout taps), to yield a trainable self-coherent optical detector module. The adjustable optical filter unit may be implemented by an photonic integrated circuit, e.g. provided as a planar lightwave circuit on a photonic chip.

Figure 3:
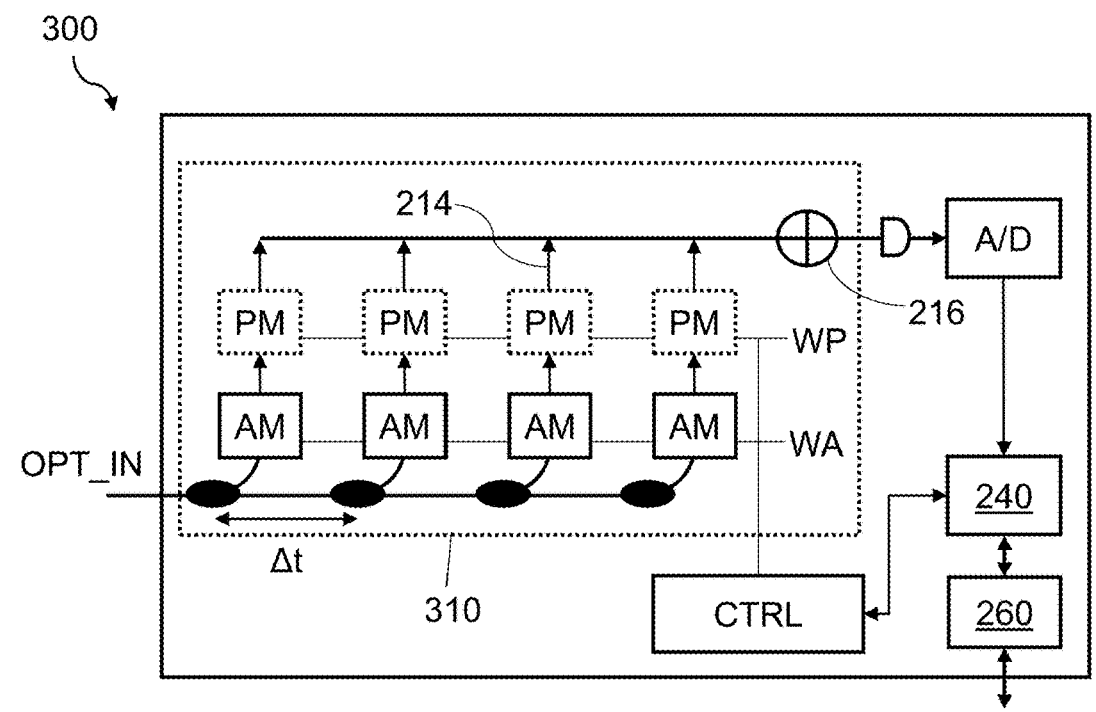
FIG. 3 shows an alternative architecture of an optical detector module, which can trained by training methods according to the invention.

FIG. 3 illustrates an alternative optical detector module 300 that can be used in training and signal recovery methods in accordance with the invention. In the alternative optical detector module 300, the DSP circuitry is part of the processing unit 240, e.g. provided as a FPGA that has been configured to carry out the DSP. The optical filter unit 310 is designed as a tapped delay line filter in the optical domain. Each signal tap 214 is delayed from the preceding one by a characteristic time delay $\Delta t$, or more generally by a multiple of the time delay $\Delta t$, and includes a phase modulator PM and amplitude modulator AM that are controlled by filter coefficients WP and WA respectively.

Figure 4:
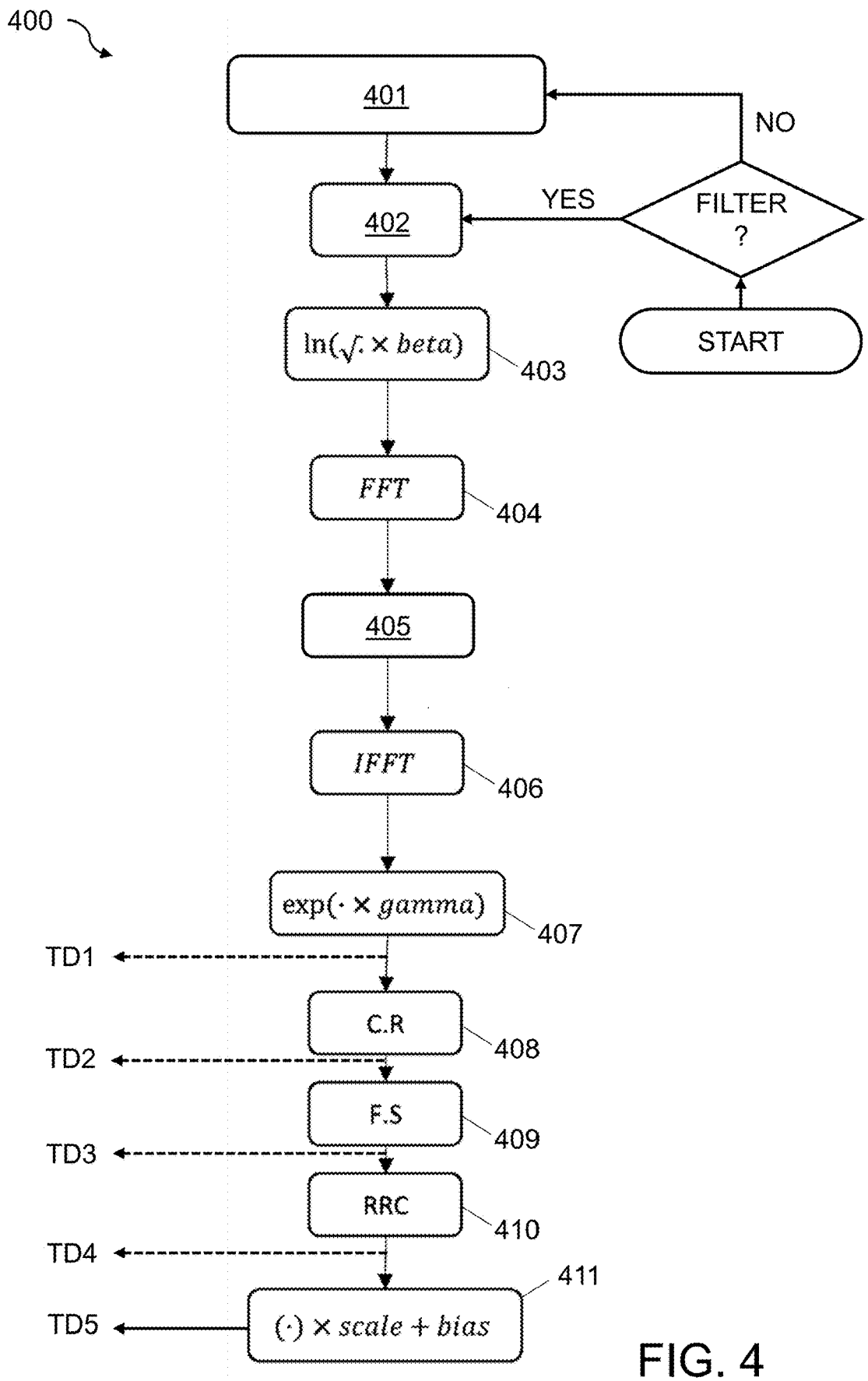
FIG. 4 displays a signal processing chain that can be implemented in the optical detector module, when trained by training methods according to the invention.

FIG. 4 gives a more detailed explanation of the type of signal processing that takes place in an optical detector module that can be trained to perform recovery of distorted optical transmission signals, in accordance with embodiment of the invention. The signal processing chain 400 in FIG. 4 can be executed in one of the optical detector modules 200 and 300, shown in FIG. 2 and FIG. 3 respectively, but is merely one non-limiting example. Different types of signal processing chains may be implemented on different kinds of self-coherent optical detector modules.

Generation of training instances, e.g. training data, of the first dataset is supported by the signal processing chain 400. In a hardware implementation of the signal processing chain 400, e.g. in a physical detector module, the generated training instances correspond to actual measurements, whereas a software implementation of the signal processing chain, e.g. in a simulation model of the detector module, the generated training instances correspond to simulated measurements. Measured training data can be used to build and improve a corresponding computer simulation model of the signal processing chain in software.

An optical transmission signal, distorted or distortion free relative to the distortion mechanisms of interest, is received and applied to the adjustable optical filter unit of the self-coherent optical detector module in step 401 if the decision to filter is positive. The optical filter unit generates a filter output signal in response to the received optical transmission signal. Optical filtering in step 401 typically comprises the sub-steps of mixing the received signal, extracting portions of the mixed signal, and recombining weighted versions of the extracted portions of the mixed signal, wherein the weighting can be varied in a controlled manner. If the decision to apply optical filtering is negative, then the optical filter unit is bypassed and the optical transmission signal is directly applied to the detection unit of the optical detector module.

Next, the filter output signal or forwarded optical transmission signal is converted into an electronic signal in step 402. If the carrier wave of the optical transmission signal has been suppressed, a local oscillator may regenerate and add the optical carrier to the transmission signal in step 402. Opto-electronic conversion typically takes place in the front-end section of the optical detector module, where a detection unit, e.g. photodetector, generates a photocurrent that is proportional to the intensity of the received optical input signal, i.e. the filter output signal or forwarded optical transmission signal. This detection step provides amplitude information relative to the optical input signal, but discards any phase information. It follows that the detection unit converts an optical input signal that is complex-valued in the optical domain into an output signal that is real-valued in the electrical domain. The detection step is therefore accompanied by a loss of signal information; here, a loss of the signal phase. Only for a particular class of input signals, the loss of information with regard to the signal phase can be avoided. The signal phase information of input signals known as minimum-phase signals is redundant, because it can be derived from the signal amplitude information, and vice versa. Signal amplitude and signal phase of a minimum-phase signal are not independent quantities. As a result, it is possible to retrieve the phase information from the detected amplitude information, and to digitally reconstruct the complex-valued optical input signal in the electrical domain, provided that the optical input signal satisfies the minimum-phase condition. It is a known fact that optical signals that comprise or consist of a single-sideband modulated carrier wave and a dominating carrier wave are minimum-phase signals, e.g. satisfy the minimum-phase condition.

Step 402 further comprises digitizing the output signal of the detection unit, e.g. using an A/D converter stage that samples and quantifies the output signal, thus resulting in a digital output signal i[n] that can be further processed by DSP circuitry of the optical detector module. At this stage, the digital output signal is representative of the time-dependent intensity value I(t) of the filtered optical signal during the detection event, e.g. through the signal sampling relationship $i[n]=k*I(t=nT)$ with sampling interval T and scaling factor k. Design variables such as the responsivity of the photodetector in the detection unit, the transimpedance gain of the TIA, and the gain associated with any subsequent voltage gain or post-amplification stages determine the scale factor k. It is noted that in particular embodiments of the invention, saturation of the photodetector in the detection unit or the transimpedance gain of the TIA can result in a nonlinear relationship between the digital output signal i[n] and the sampled intensity signal I(t), e.g. $i[n]=f_{nl}\{k*I(t=nT)\}$, where $f_{nl}$ is a nonlinear, saturating function. Such a nonlinear relationship does not prevent execution of the training method and can even be beneficial in some applications, e.g. when the nonlinear relationship reduces nonlinearity distortions that impair the quality of a signal transmitted over a communication channel.

In order to retrieve the phase information from the detected amplitude information and to fully reconstruct the optical input signal in the digital domain, a series of steps 403-407 are performed by the DSP circuitry of the optical detector module. These steps make use of the mathematical relationship $\exp\{\ln(s)\}=s$ for any non-zero analytic signal s(t) and the fact that the analytical signal s(t) can be constructed from a non-analytic, real-valued signal I(t)— e.g. the detected intensity of the optical input signal in the detection unit—by suppression of its negative frequency components.

More specifically, the logarithm of the digital output signal is computed in step 403, e.g. the digital output signal from the detection unit is transformed according to a logarithmic function: $i[n] \rightarrow \ln\{|i[n]|\}$ (omitting the squaring of the modulus, which reduces to scaling the logarithmic function by a factor of two). Optionally, a scale factor $\beta$ (beta) is applied to the digital output signal, e.g. to cancel the effect of the above-mentioned scale factor k or to normalize the digital output signals. Moreover, the digital output signal from the detection unit, i[n], may be upsampled prior to calculating the logarithmic function. The spectrum of the resulting signal is computed in step 404, e.g. by application of the discrete-time fast Fourier-transform (FFT). Negative frequency components of the computed signal spectrum are removed in step 405, e.g. by applying a scaled Heaviside function in the spectral domain, which amounts to setting negative frequency components to zero, keeping the dc-component unchanged and multiplying the positive frequency components by a factor of two. This is followed by an inverse fast Fourier-transform (IFFT) step 406, which converts the non-negative spectrum back into a time-dependent signal ln{s[n]}, thus obtaining the analytic signal representation of the real-valued logarithm of the detected amplitude information ln{|i[n]|}. Standard window functions may be used for the FFT and IFFT to ensure equal length of the time traces before the FFT and after the IFFT step respectively. Window functions may also be used to split long transmission signals into a plurality of shorter signal sequences, which can be processed more readily by the DSP circuitry. Eventually, the analytic signal representation ln{s[n]}=ln{|i[n]|}+j*Arg {s[n]} is input to an exponential function in step 407 to give s[n]=exp {ln{s[n]}}=|s[n]|·*exp {j*Arg {s[n]}}, the reconstruction of the complex-valued optical input signal in the digital domain. Optionally, a further complex-valued scale factor γ (gamma) is applied in step 407, whereby a nonlinear function of the digital reconstruction of the optical input signal is computed. The reconstructed signal s[n] is a faithful representation of the complex-valued filter output signal or forwarded optical transmission signal in the digital domain, including both amplitude and phase information.

For the purpose of recovering also the baseband signal associated with the transmitted optical signal, and optionally classifying the transmitted data of the baseband signal, e.g. the transmitted code symbols, embodiments of the invention may include subsequent processing of the reconstructed digital signal s[n]. Insofar as they preserve the reconstructed amplitude and phase information, these signal post-processing steps that are considered faithful representations of the filter output signal or forwarded optical transmission signal in the digital domain. Digital signal post-processing may include up- or downsampling operations, noise-reduction by filters, moving average filters, and each of the steps 408-411 of the processing chain 400 in particular. For example, the digital output signals TD1-TD5 that are obtained after each one of the following steps are considered eligible training signals for the purpose of building the first dataset: removal of the carrier wave in step 408, frequency shifting in step 409 (to restore the baseband signal), application of a root-raised cosine filter in step 410, and scaling and biasing of the processed signal in step 411.

Figure 7:
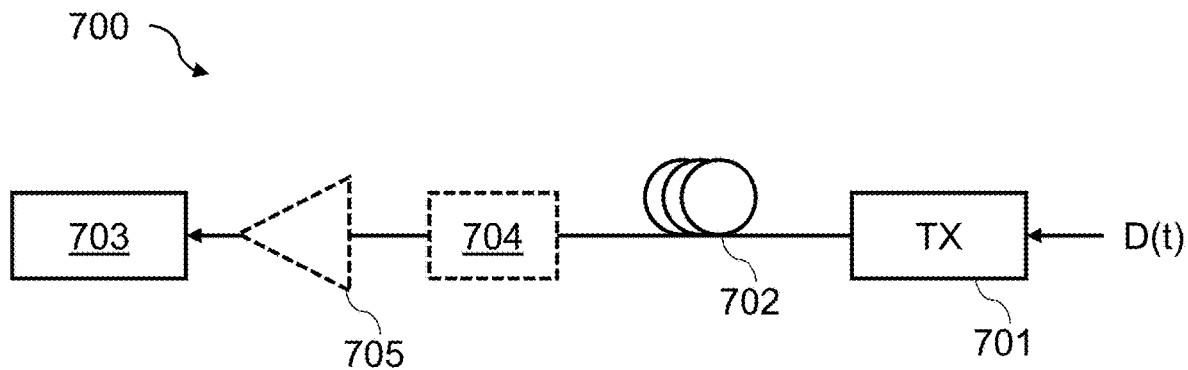
FIG. 7 shows a communication system with optical detector module that can be trained to recover optical distorted transmission signals, in accordance with embodiments of the invention.

Referring now to FIG. 7, a communication system 700 for optical transmission of a digital data stream D(t) is shown. The communication system comprises an optical transmitter 701, an optical fiber channel 702, and a self-coherent optical detector module 703, e.g. a self-coherent optical receiver such as a Kramers-Kronig optical receiver. Distortions can affect the quality of the transmitted optical signal at various stages along the transmission path, e.g. in the fiber channel but also in the transmitter components which translate the data stream D(t) into an optical signal. Part of the transmitted information may be lost as a result of the distortions. Forward error coding (FEC) techniques may mitigate the loss of information due to distorted transmission signals, but only up to a certain threshold called the FEC limit. It is thus desirable to operate the communication system below the FEC limit; a task that is facilitated if the optical detector module 703 has been trained to recover distorted optical transmission signals, e.g. has learnt to compensate the distortions in the transmitted optical signal such that the detected and recovered signals resemble as much as possible the originally intended transmission signal, e.g. in its pristine or undistorted form. The recovery of distorted optical transmission signals can be learnt in respect of a single distortion mechanism in the communication system, e.g. fiber nonlinearity impairments such as self-phase modulation, or a combination of distinct distortion mechanisms, e.g. fiber nonlinearity impairment and chromatic dispersion.

The transmitter 701 configured to encode the incoming data stream D(t) in a sequence of (code) symbols and generate a series of optical pulses for transmission over the fiber channel 702, in accordance with the respective symbols of the sequence. The light that is output by a cw-laser may be externally modulated to shape the optical pulses. Amplitude and/or phase modulation of an optical carrier wave may be performed by the transmitter, depending on the modulation format selected for the fiber link. For instance, a 64-QAM scheme requires eight distinct amplitude levels and eight distinct phase levels when translating the symbols of the sequence onto a corresponding sequence of optical transmission pulses.

Transmitter 701 is further configured to perform single-sideband (SSB) modulation of the optical carrier wave, in which only the upper or the lower side band of the modulated optical waveform is transmitted for improved spectral efficiency. The carrier wave that is modulated may either be suppressed and added back to the carrier-suppressed SSB signal after transmission over the optical fiber channel 702, e.g. at the input of the self-coherent optical detector module 703 or directly in the detection unit of the optical detector module, or may be kept (possibly in reduced form) for transmission over the optical fiber channel along with the single sideband. Although transmission of the carrier wave together with the sideband is less power-efficient as compared to carrier-suppressed SSB transmission, the presence of the carrier wave is beneficial for the coherent demodulation of the transmitted signal in the self-coherent optical detector module.

The optical signal is transmitted to the optical detector module via a fiber channel 702, e.g. short-haul fiber link in a data center or a long-haul fiber link in a metropolitan communication network. Typical distortions that optical transmission signal experiences, while it is propagating along the fiber channel 702, are chromatic dispersion and fiber nonlinearities. The latter are aggravated in the context of single-sideband modulation formats that use a dominant carrier wave, but the simplicity of the direct detection scheme in the self-coherent optical detector module 703 balances or even outweighs this disadvantage. A dispersion compensation module or a piece of dispersion compensating fiber 704 may be arranged in the fiber channel 702 if chromatic dispersion artefacts in the transmitted optical signal should be avoided. This is particularly useful, e.g., in situations in which the optical detector module 703 is trained to recover optical transmission signals that are predominantly distorted by fiber nonlinearities. Optionally, an optical amplifier 705 is disposed in the fiber channel 702 so that the optical signal to noise ratio at the optical detector module 703 can be increased.

The optical detector module 703 preferably implements the signal processing steps of FIG. 4 and its internal structure may be similar to those shown in FIG. 2 and FIG. 3. The optical detector module 703 can been trained to perform signal recovery, in accordance with embodiments of the first aspect. The first and/or second dataset for training can be built from data measured by the optical detector module 703 as part of the communication system 700. Training sequences can be sent sporadically, whilst the optical detector module 703 is operative, to allow continuous learning, e.g. to adapt the filter coefficients to variations in the fiber channel or components of the transmitter over time.

Numerical Experiment

To demonstrate the capability of self-coherent detector modules with adjustable optical input filter to learn the signal recovery task in connection with distorted optical transmission signals, the transmission of optical signals by the communication system of FIG. 7 has been mimicked by simulation software and the training method applied to the simulated optical detector module. A high intensity, single polarization 64-QAM transmission signal has been propagated along a standard single-mode fiber over distances between 20 km and 100 km. Kerr-type fiber nonlinearity and non-ideal transmitter behavior have been considered as the primary distortion mechanisms of interest. The single-mode fiber link has been terminated by a dispersion compensating fiber and an optical fiber amplifier at the receiver side. The amplifier boosted the signal by 15 dB and also compensated for the linear propagation losses in the fiber channel. Table 1 summarizes the main simulation parameters used for the transmitter, fiber channel and the receiver.

In the simulation, an on-chip passive photonic reservoir with 16 readout channels implements the optical filter unit of a self-coherent Kramers-Kronig (KK) receiver. The photonic reservoir is formed in formed in silicon nitride and contains a plurality of waveguides and a plurality of 3×3 multimode interferometer (MMI) couplers, wherein the MMI couplers act as network nodes which interconnect the waveguides. Delays in the waveguide ranging between 10% to 90% of the symbol time have been investigated.

Figure 8:
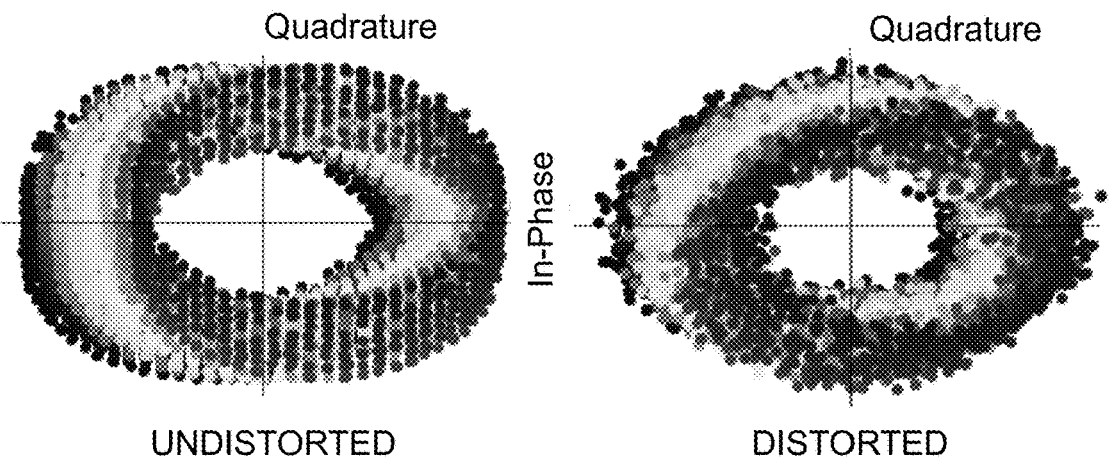
FIG. 8 shows constellation plots of distorted and undistorted optical transmission signals, used to derive training data in embodiments of the invention.
Figure 9:
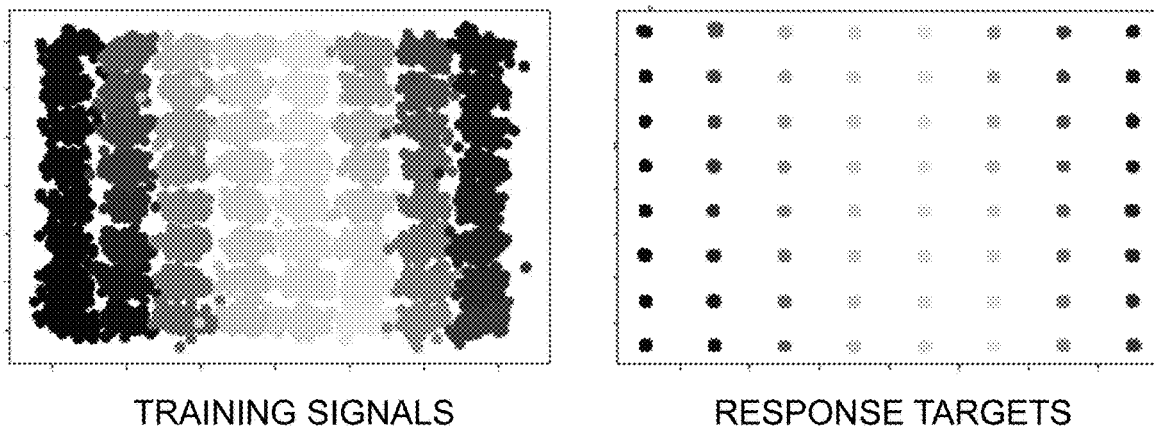
FIG. 9 shows constellation plots of training signals and associated response targets derived for the transmission signals in FIG. 8, which can be used as training data of the first dataset in embodiments of the invention.

Training data of the first and second dataset has been derived from the same set of optical transmission signals: about 8000 symbols have been transmitted according to the single-sideband 64-QAM modulation format and distorted by transmitter imperfections and fiber nonlinearity. Simulated filtering of the transmitted signals by the optical filter unit resulted in the training data of the second dataset, while generating the training data of the first dataset involved the additional steps of simulated detection and digital reconstruction in the optical detector module. The respective undistorted and unfiltered versions of the transmitted signals served as response targets. FIG. 8 plots the constellation of the optical transmission signals before and after distortion. A constellation diagram of resulting training signals is shown in FIG. 9, together with the associated response targets. During training of the filter coefficients in the 16 readout channels of the reservoir, an error backpropagation algorithm has been used, which included the entire receiver and post-processing pipeline. The loss function for the backpropagation algorithm was the mean square error. The initial set of filter coefficients has been determined by ridge regression

TABLE 1

| Simulation parameters | | |
|---|---|---|
| Transmitter (Tx) | Fiber | Receiver (Rx) |
| Root-raised cosine pulse shaping filter | Attenuation = 0.02 dB/km | Bandwidth = 70 GHz |
| Gray-coded 64 QAM | Nonlinear coefficient = 1.31 W-1 km-1 | OSNR @ RX = 27 dB |
| Baud rate = 64 Gbauds | Length = 20-100 km | Responsivity = 0.5 A/W |
| CSPR = 11 dB | Dispersion parameter = 16 ps/(nm km) | Dark current = 5 nA |
| Signal power = 3 dBm | PMD coefficient = 0 ps/$\sqrt{km}$ | Upsampling to 6 samples/symbol |
| Subcarrier frequency offset = 34 GHz | | |
| Laser linewidth = 0 Hz | | |

Figure 10:
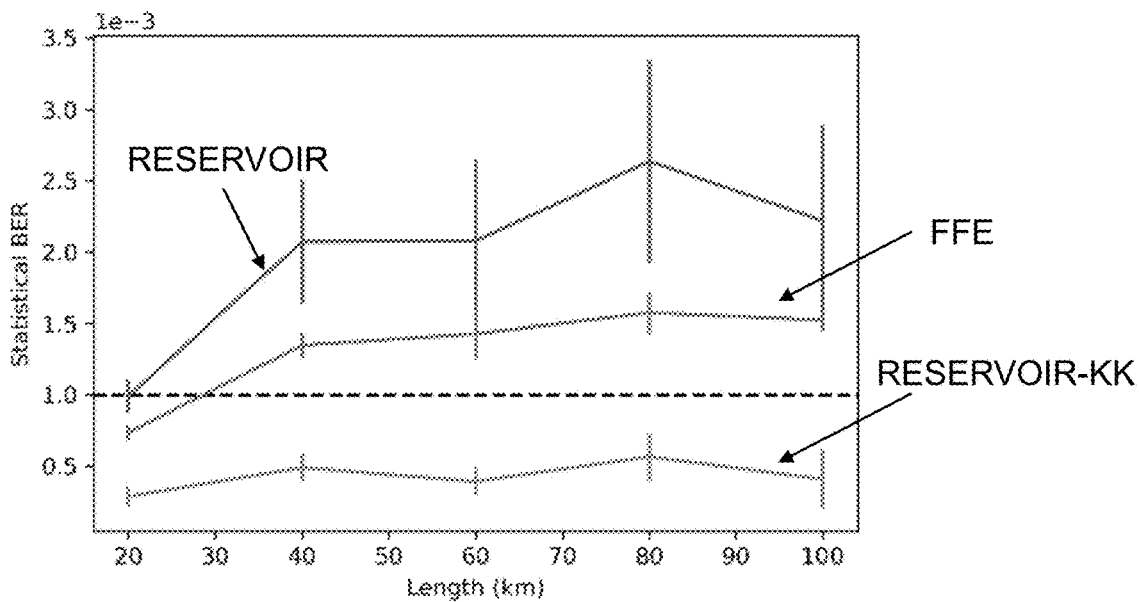
FIG. 10 compares test bit error rates for the signal recovery task that uses 64-QAM modulated signals between a self-coherent optical detector module in accordance with embodiments of the invention, an optical feedforward equalizer and a plain optical reservoir.

For the single-sideband 64-QAM transmission signals, a carrier to signal power ratio above 9 dB yielded low enough bit error rates. Optimal delay in the reservoir waveguides was found about one half of the symbol time. The test results have been evaluated for over 1.3E+5 transmission symbols, generated using a Winchman-Hill random generator. Test bit errors about 5E−4, well below the 1E−3 pre-FEC threshold, were obtained with the proposed purposeful initialization of the filter coefficients. Using the additional training parameters beta and gamma of FIG. 4 during optimization of the filter coefficients, the test bit error rate could be reduced from 5.5E−4 to 4.5E−4. This is to be compared with the test bit error rate of 3.8E−1 in the case of randomly initialized filter coefficients. FIG. 10 shows the test bit error rates achieved for different lengths of the fiber channel and further comparative results obtained in respect of a 16-tap optical feedforward equalizer (FFE), and the simulated reservoir without KK receiver.

In embodiments of the invention, polarization-diverse optical detector modules can be implemented. The above-described optical detector modules can be adapted to cope with two orthogonal polarization directions, e.g. by using a polarization beam splitter (e.g. co-integrated with the optical filter units), two separate, but similar optical filter units, each configured to receive optical inputs of a single polarization state, two detection units, and a digitally implemented polarization analysis and tracking unit. The digital reconstruction of the optical inputs by the DSP circuitry is then performed relative to the tracked polarization state. This allows the training method to be extended to polarization-diverse modulation schemes.

Embodiments of the invention described so far have been trained on distorted telecommunication signals. However, the different aspects of the invention can also be applied in related fields of technology, in which optical signals are distorted on their path between a sender and a detector/receiver. For instance, optical scanning systems may be adapted and trained to compensate signal distortions that are the result of optical aberrations. Similarly, lidar-based ranging systems may be adapted and trained to compensate signal distortions that are the result of atmospheric scattering effects.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A computer-implemented method of training a self-coherent detector module to recover distorted optical transmission signals, said detector module comprising an optical filter unit, a detection unit for detecting an amplitude component of an optical input, and digital signal processing circuitry configured to retrieve a phase component of the optical input from the amplitude component, the method comprising:
   (i) receiving a first dataset comprising a plurality of training signals and associated response targets corresponding to digital reconstructions of a first set and a second set of optical inputs respectively,
   wherein optical inputs of said first set of optical inputs are output signals of the optical filter unit, generated in response to distorted versions of a corresponding first set of optical transmission signals,
   wherein optical inputs of said second set of optical inputs are undistorted versions of said first set of optical transmission signals, and
   wherein said digital reconstructions of said first and said second set of optical inputs include the amplitude component detected by the detection unit and the phase component retrieved by the digital signal processing circuitry in respect of each optical input of said first and said second set of optical inputs;
   (ii) computing updates of adjustable filter coefficients of the optical filter unit that lower an approximation error between the training signals and associated response targets of the first dataset;
   (iii) replacing the digital reconstructions of the first set of optical inputs by the digital reconstructions of a third set of optical inputs, thus updating the training signals of the first dataset, wherein optical inputs of said third set of optical inputs are output signals of the optical filter unit, generated in response to the distorted versions of the first set of optical transmission signals, using the updated filter coefficients of the optical filter unit;
   (iv) iterating steps (ii) to (iii);
   (v) generating control signals for setting the filter coefficients of the optical filter unit according to the computed updates;
   wherein an initial set of filter coefficients is determined by:
   (vi) receiving a second dataset comprising a plurality of training signals and associated response targets,
   wherein the training signals of the second dataset are output signals of the optical filter unit, generated in response to distorted versions of a second set of optical transmission signals, and
   wherein the response targets associated with the training signals of the second dataset comprise undistorted versions of said second set of optical transmission signals;
   (vii) computing filter coefficients of the optical filter unit that lower an approximation error between the training signals and associated response targets of the second dataset.

2. The method according to claim 1, wherein the optical transmission signals of the first and second set of optical transmission signals are single-sideband modulated signals including a carrier wave, a carrier wave to sideband signal power ration being larger than one.

3. The method according to claim 1, wherein step (ii) and/or step (vii) includes executing an optimization algorithm.

4. The method according to claim 1, further comprising the step of receiving a simulation model of the detector module, wherein step (ii) includes executing a digital error backpropagation algorithm to propagate the approximation error back between the training signals and associated response targets of the first dataset through the simulation model of the detector module.

5. The method according to claim 1, further comprising the step of reshaping the training signals of the first dataset prior to performing step (ii), by applying a nonlinear function to the digital reconstructions of said first set of optical inputs.

6. The method according to claim 1, wherein receiving the first dataset in step (i) includes loading measurement data relating to the detector module, said measurement data comprising the digital reconstructions of the first and second set of optical inputs.

7. The method according to claim 1, further comprising the step of loading a simulation model of the detector module,
   wherein receiving the first dataset in step (i) and/or receiving the second dataset in step (vi) includes:
      when receiving the first dataset in step (i), simulating signal passes of the distorted versions of said corresponding first set of optical transmission signals through at least a portion of the simulation model of said detector module; and
      when receiving the second dataset in step (vi), simulating signal passes of the distorted versions of said corresponding second set of optical transmission signals through at least a portion of the simulation model of said detector module.

8. The method according to claim 7, wherein the optical transmission signals correspond to symbols of at least one symbol stream transmitted over a communication channel impaired by nonlinearity distortions, the method further comprising the step of simulating symbol transmission across the communication channel to obtain distorted versions of the optical transmission signals.

9. The method according to claim 1, further comprising the steps of:
   storing the updated filter coefficients on a computer-readable medium after the last iteration of step (iv);
   loading the stored filter coefficients from the computer-readable medium into the self-coherent detector module prior to carrying out step (v).

10. A non-transitory computer-readable medium having stored thereon instructions which, when the instructions are executed by a computer, cause the computer to execute the steps of claim 1.

11. A self-coherent detector module comprising an optical filter unit with adjustable filter coefficients for generating a filtered optical signal in response to an optical input signal, a detection unit for detecting an amplitude component of the filtered optical signal, digital signal processing circuitry configured to retrieve a phase component of the filtered optical signal from the detected amplitude component, and means for carrying out the method steps of claim 1.

12. The detector module according to claim 11, wherein the optical filter unit comprises a signal mixing unit composed of interconnected delay lines, and a plurality of readout taps connected to respective terminals of the delay lines.

13. The detector module according to claim 11, wherein the optical filter unit comprises a plurality of readout taps, different readout taps having different delays.

14. The detector module according to claim 11, further comprising a processing unit configured to:
   control the detection unit to perform an amplitude measurement, control digital signal processing circuitry to perform a phase retrieval, control bypassing of the optical filter unit.

15. The detector module according to claim 14, wherein the processing unit is further configured to estimate the amplitude and phase components of a plurality of weighted optical signals, supplied to the detection unit via a corresponding plurality of readout taps of the optical filter unit, based on a series of amplitude measurements by the detection unit, wherein each amplitude measurement of the series of amplitude measurements is associated with a different set of filter coefficients of the optical filter unit, the different sets of filter coefficients spanning the space of all possible filter coefficients.

\* \* \* \* \*